No. 856,065. PATENTED JUNE 4, 1907.
A. J. JACKSON.
PNEUMATIC TIRE.
APPLICATION FILED OCT. 30, 1905.
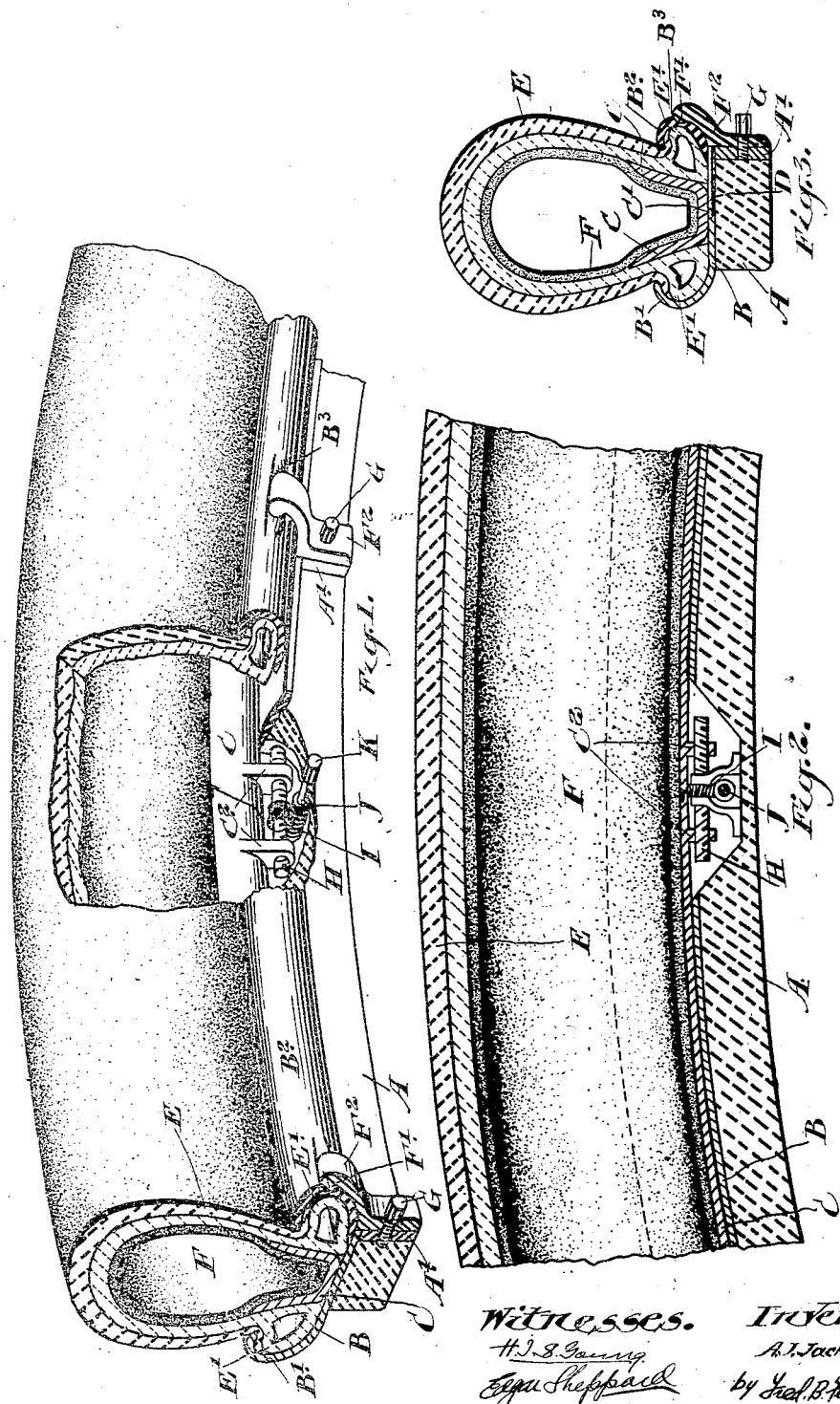

UNITED STATES PATENT OFFICE.

ARTHUR JAMES JACKSON, OF TORONTO, ONTARIO, CANADA.

PNEUMATIC TIRE.

No. 856,065.  Specification of Letters Patent.  Patented June 4, 1907.

Application filed October 30, 1905. Serial No. 285,096.

*To all whom it may concern:*

Be it known that I, ARTHUR JAMES JACKSON, of the city of Toronto, in the county of York, in the Province of Ontario, Canada, have invented certain new and useful Improvements in Pneumatic Tires, of which the following is the specification.

My invention relates to improvements in pneumatic tires particularly adapted to automobiles and the object of the invention is to devise a simple, strong, durable and readily detachable means for securing the tire on the wheel, which will require but a minimum amount of time to remove the tire in case of a puncture and to replace it again and it consists essentially of a felly preferably provided with a side ring, a rim secured on the felly and preferably provided with a detachable retaining edge, detachable clips arranged to secure the detachable retaining edge of the rim in position and a retaining ring secured to the rim and extending around the same and designed to form interior walls to aid in holding the retaining bead of the envelop in position both on the permanent and removable side of the rim as hereinafter more particularly explained.

Figure 1, is a perspective view partially broken away and in section showing portion of a felly, rim and tire of an automobile and the parts involved in my invention. Fig. 2, is a longitudinal section of Fig. 1. Fig. 3, is a cross section.

In the drawings like letters of reference indicate corresponding parts in each figure.

A is the felly of the wheel, which is provided with the face plates $A^1$.

B is the rim which is provided with one curled edge $B^1$ and a detachable curled edge $B^2$ at the opposite side.

C is a retaining ring of a broad V-shaped cross section having one or more teats $C^1$, which fit in a cross groove D in the rim, which enables the retaining ring C to be withdrawn laterally but prevents it from creeping circumferentially.

E is the envelop and F the internal air tube. It will be noticed that the envelop E is of the usual construction and formed with the holdfast beads $E^1$, which are held in position by the curled edge $B^1$ at one side and the detachable curled edge on the opposite side, such detachable curled edge being retained in position by the clips $F^2$ having the teats $F^1$ extending into the recesses $B^3$. The clips $F^2$ may be located at any desired position and are preferably in the form shown or may be in any other suitable form, such clips being secured in position, so as to hold the curled retaining edge $B^2$ securely by means of bolts G extending into the plates $A^1$ or other suitable devices, which may be readily detachable.

The retaining ring C is a divided ring as indicated in Figs. 1 and 2, the ends preferably over-lapping in the form shown or in any other suitable manner. Near the joint of the end of the divided retaining ring C are formed lugs $C^2$ through which extend the right and left hand threaded spindle H.

I is a worm wheel secured centrally of the spindle H and J is a worm meshing therewith and provided with a suitably sided turning end K on which a wrench may be applied. It will now be seen by turning the worm J the ends of the divided rim may be drawn together, so as to securely hold it on the rim or separated so that it may be readily withdrawn laterally from the rim as will hereinafter appear. Should it become necessary to remove the tire on account of a puncture or for any other reason all that it is necessary to do is first to deflate the tire, loosen the bolts G, so that the clips may be withdrawn sufficiently far to disengage the teat on the end of the same from the recesses $B^3$ when the clips may be turned inwardly and the curled retaining edge ring withdrawn. The worm may be also manipulated as hereinbefore described, so as to separate the retaining ring C, which may then also be withdrawn and the tire removed from the rim and repaired if necessary. After being repaired the tire may be then replaced in position by reversing the manner of procedure hereinbefore referred to.

It will be seen from this description that my device is extremely simple and may be readily manipulated by inexperienced people, which is an important desideratum.

What I claim as my invention is

1. In a pneumatic tire, the combination with the rim having one permanent retaining edge and the tire and the retaining ring, of a detachable edge ring for the rim and the clips provided with teats extending laterally into recesses in the detachable ring and an inwardly extending portion fitting on the side face of the felly and the bolts extending through the clips laterally into the felly or rim as and for the purpose specified.

2. The combination with the rim having one permanent edge and the tire and the retaining ring divided as shown and provided with lugs on each side of the division extending into a recess in the felly, the right and left hand screw spindle extending through the correspondingly threaded holes in the lugs, the worm wheel secured in the center of the spindle and the worm meshing therewith and provided with a turning spindle extending laterally through the outside of the side face of the felly, of a detachable edge ring for the rim and means for holding the detachable ring in position as and for the purpose specified.

ARTHUR JAMES JACKSON.

Witnesses:
M. BOYD,
R. SMITH.